United States Patent
Gunaratna et al.

(10) Patent No.: US 11,687,570 B2
(45) Date of Patent: Jun. 27, 2023

(54) SYSTEM AND METHOD FOR EFFICIENT MULTI-RELATIONAL ENTITY UNDERSTANDING AND RETRIEVAL

(71) Applicant: Samsung Electronics Co., Ltd., Suwon-si (KR)

(72) Inventors: Dalkandura Arachchige Kalpa Shashika Silva Gunaratna, San Jose, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 425 days.

(21) Appl. No.: 16/900,664

(22) Filed: Jun. 12, 2020

(65) Prior Publication Data

US 2021/0241050 A1    Aug. 5, 2021

Related U.S. Application Data

(60) Provisional application No. 62/969,515, filed on Feb. 3, 2020.

(51) Int. Cl.
  *G06F 16/28*   (2019.01)
  *G06N 3/04*   (2023.01)
  *G06F 16/2455*   (2019.01)
  *G06N 5/025*   (2023.01)
  *G06V 30/196*   (2022.01)
  *G06F 18/214*   (2023.01)

(52) U.S. Cl.
  CPC ...... *G06F 16/288* (2019.01); *G06F 16/24564* (2019.01); *G06F 18/214* (2023.01);
  (Continued)

(58) Field of Classification Search
  CPC ... G06F 16/288; G06F 16/24564; G06N 3/04; G06N 5/025; G06K 9/6256; G06V 30/1988; G06V 10/774
  See application file for complete search history.

(56) References Cited

U.S. PATENT DOCUMENTS 10,165,066 B2   12/2018   Nandagopal et al.
10,423,652 B2   9/2019   Zhai et al.
(Continued)

FOREIGN PATENT DOCUMENTS

KR   10-2015-0132860 A   11/2015
WO   2019220128 A1   11/2019

OTHER PUBLICATIONS

International Search Report and Written Opinion of the International Searching Authority in connection with International Application No. PCT/KR2021/000579 dated Apr. 28, 2021, 8 pages.
(Continued)

*Primary Examiner* — Daniel G Mariam

(57) ABSTRACT

A method, an electronic device and computer readable medium for entity-relationship embeddings using automatically generated entity graphs instead of a traditional knowledge graph are provided. The method includes receiving, by a processor, an input text. The method also includes identifying a primary entity, a secondary entity and a context from the input text, wherein the context comprises a relationship between the primary entity and the secondary entity. The method additionally includes generating, by the processor, an entity context graph based on the primary entity, the secondary entity, and the context by: extracting, from the context, one or more text segments comprising a plurality of words describing one or more additional relationships between the primary entity and the secondary entity, and generating a plurality of context triples from the one or more text segments, each of the plurality of context triples defining a respective relationship between primary entity and the secondary entity.

20 Claims, 12 Drawing Sheets

(52) U.S. Cl.
CPC ............... *G06N 3/04* (2013.01); *G06N 5/025* (2013.01); *G06V 30/1988* (2022.01)

(56) References Cited

U.S. PATENT DOCUMENTS

| | | |
|---|---|---|
| 10,943,072 B1 * | 3/2021 | Jaganmohan .......... G06N 5/041 |
| 2003/0236764 A1 | 12/2003 | Shur |
| 2014/0282219 A1 | 9/2014 | Haddock |
| 2015/0178273 A1 * | 6/2015 | Hakkani-Tur .......... G06F 40/40 704/9 |
| 2016/0012110 A1 | 1/2016 | Hirzel et al. |
| 2017/0099249 A1 * | 4/2017 | Kozareva ................ G06N 5/022 |
| 2019/0095515 A1 | 3/2019 | Buesser et al. |
| 2019/0287006 A1 | 9/2019 | Costabello et al. |
| 2019/0303498 A1 * | 10/2019 | Saha ....................... G06N 5/003 |
| 2019/0312869 A1 | 10/2019 | Han et al. |
| 2020/0242140 A1 * | 7/2020 | Xu ....................... G06F 16/3326 |
| 2022/0207067 A1 * | 6/2022 | Lee ..................... G06F 16/3344 |

OTHER PUBLICATIONS

Mohsen Mesgar et al., "A Neural Local Coherence Model for Text Quality Assessment", Proceedings of the 2018 Conference on Empirical Methods in Natural Language Processing, Brussels, Belgium, Oct. 31-Nov. 4, 2018, pp. 4328-4339.

T. Mitchell, et al., "Never-Ending Learning," Communications of the ACM, vol. 61, No. 5, May 2018, pp. 103-115.

* cited by examiner

_US 11,687,570 B2_

SYSTEM AND METHOD FOR EFFICIENT MULTI-RELATIONAL ENTITY UNDERSTANDING AND RETRIEVAL

CROSS-REFERENCE TO RELATED APPLICATION AND CLAIM OF PRIORITY

This application claims priority under 35 U.S.C. § 119(e) to U.S. Provisional patent Application No. 62/969,515 filed on Feb. 3, 2020. The above-identified provisional patent application is hereby incorporated by reference in its entirety.

TECHNICAL FIELD

This disclosure relates generally to intelligent understanding of things to support intelligent search, retrieval, and personal assistant tools, such as a question answering system. More specifically, this disclosure relates to entity-relationship embeddings using automatically generated entity graphs.

BACKGROUND

Methods for understanding of things or entities requires well curated structured information stored using a knowledge representation format in a knowledge graph (KG). A KG is composed of facts and information about inter-related entities. It is extremely important to put entity-based information stored in a special representation format. The structured data in the KG enables next generation's intelligent search, retrieval, and personal assistant tools, which is achieved by transforming this structured data (symbolic) into continuous vector format (namely, embeddings). Further, certain Web search companies have started a community driven project (a general ontology that describes entities) to tag entities in Web pages so that search engines optimize search results by using this entity metadata. This also shows the real-world need to understand entities to enable better services. Question answering systems utilize entity facts by linking question phrases to KGs and then search KGs to find answers.

Creation of a KG is both time consuming and expensive, requiring many hours of manpower to create. It is also difficult to maintain and update a KG given large number of relationships and combinations that change daily. Another problem is that a KG defines the relationships between entities as a fixed set of short labels. Therefore, capturing a complex relationship in a triple format becomes complex and requires a lot of attention to create and maintain. Current methods tend to avoid capturing these complex relationships because it is too hard to capture and represent and use in applications.

SUMMARY

This disclosure provides systems and methods creating an entity graph from text descriptions and computing embeddings.

In a first embodiment, a method includes receiving, by a processor, an input text. The method also includes identifying a primary entity, a secondary entity and a context from the input text, wherein the context comprises a relationship between the primary entity and the secondary entity. The method additionally includes generating, by the processor, an entity context graph based on the primary entity, the secondary entity, and the context by: extracting, from the context, one or more text segments comprising a plurality of words describing one or more additional relationships between the primary entity and the secondary entity, and generating a plurality of context triples from the one or more text segments, each of the plurality of context triples defining a respective relationship between primary entity and the secondary entity.

In a second embodiment, an electronic device includes a processor and a memory operably coupled to the processor. The memory includes instructions executable by the processor to: receive an input text, identify a primary entity, a secondary entity and a context from the input text, wherein the context comprises a relationship between the primary entity and the secondary entity, generate, by the processor, an entity context graph based on the primary entity, the secondary entity, and the context by: 1) extracting, from the context, one or more text segments comprising a plurality of words describing one or more additional relationships between the primary entity and the secondary entity, and 2) generating a plurality of context triples from the one or more text segments, each of the plurality of context triples defining a respective relationship between primary entity and the secondary entity.

In a third embodiment, a non-transitory machine-readable medium contains instructions that, when executed, cause at least one processor of an electronic device to: receive an input text, identify a primary entity, a secondary entity and a context from the input text, wherein the context comprises a relationship between the primary entity and the secondary entity, generate, by the processor, an entity context graph based on the primary entity, the secondary entity, and the context by: 1) extracting, from the context, one or more text segments comprising a plurality of words describing one or more additional relationships between the primary entity and the secondary entity, and 2) generating a plurality of context triples from the one or more text segments, each of the plurality of context triples defining a respective relationship between primary entity and the secondary entity.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
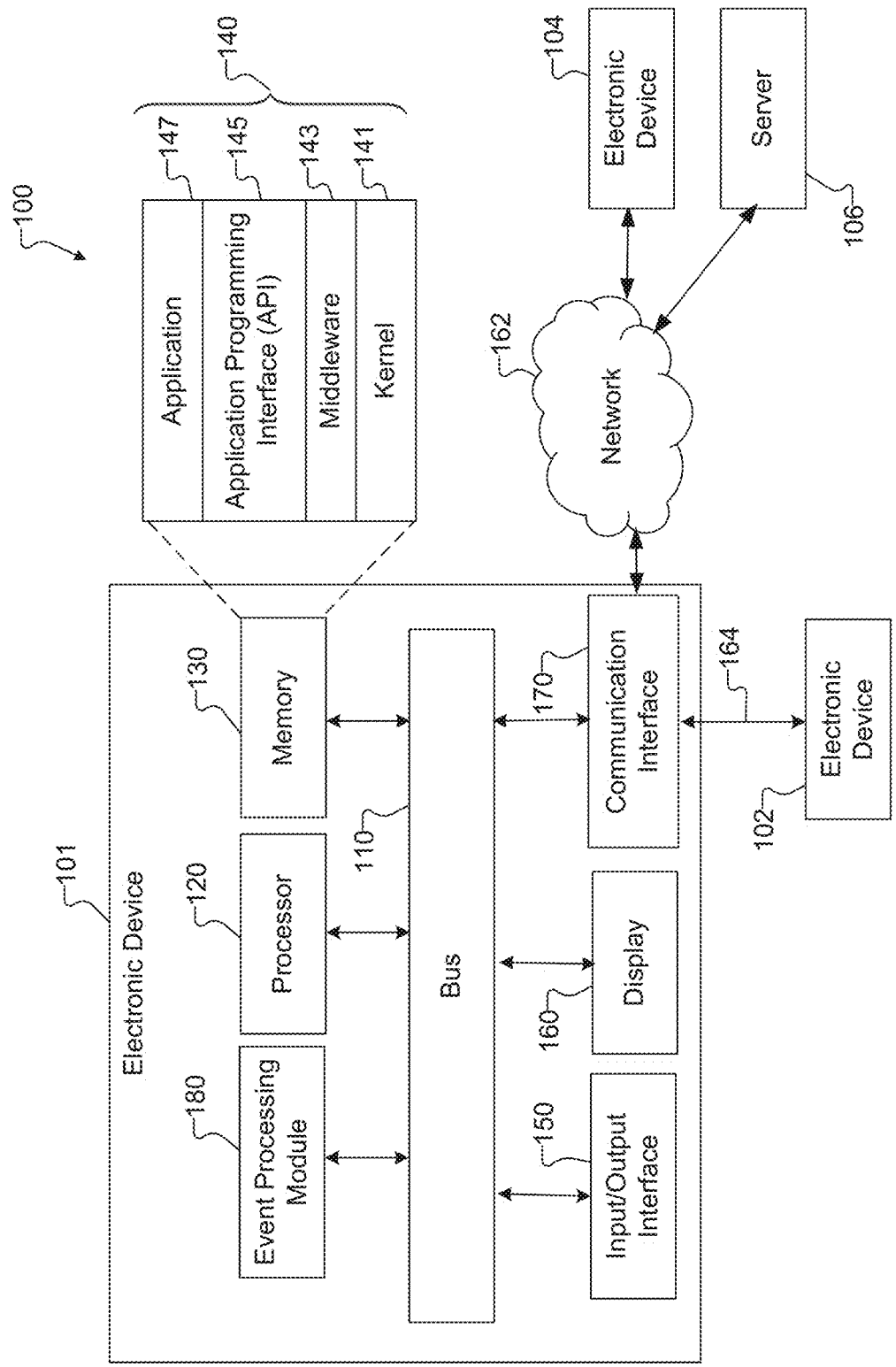
FIG. 1 illustrates an example network configuration according to embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

A Knowledge Graph (KG) helps predict the relationship between two entities by mining existing triples, wherein a triple is a subject-relationship-object tuple. A triple includes KG components of two entities (subject and object) and a relationship between the entities. KG components, i.e. entities and relationships, are transformed or embedded into continuous vector format called embeddings. The data structured in these KGs enables next generation's intelligent search, retrieval, and personal assistant tools.

Knowledge Graphs are costly to construct but they enable understanding of things in modern applications and algorithms. Certain embodiments of the present disclosure provide a capability to construct an entity graph automatically from a textual knowledge source. Embodiments of the present disclosure provide a system and method that can then learn entity-relationship embeddings using this graph instead of a traditional KG. Further, this automatic process supports changing data environments and domain-specific entity centric knowledge capturing for entity-based search and retrieval (with optional given context text).

Certain embodiments provide for a system and method able to provide responsive output to textual input regarding one or more subjects (entities). A mobile device, or computing device, is configured to receive an inquiry regarding one or more entities. The mobile device, or computing device, can access and search an existing KG to obtain a response to the inquiry. The mobile device searches KG triples in the existing KG to identify a relationship mentioned in inquiry. If no match is found or the KG does not contain a fact responsive to the inquiry, the mobile device accesses, obtains, or creates, intermediate post-processed context triples. For example, the mobile device, or computing device, can create one or more context triples as disclosed herein below. The mobile device can extract a most prominent/suitable relation word/verb as the relation to represent a traditional KG triple by joining subject and object entities of the Context triple. Now the KG has additional triples extracted from Context triples. When a question is received, the KG is searched for triples with a matching relation identified in the question. The mobile device, or computing device, is further configured to process the context triples and KG triples to extract more triples to add to the KG triples.

Certain embodiments provide for inputs that include a structured text corpus that describes entities/concepts using documents/text. Additional or alternative inputs include a list of entities or an entity detection method.

Certain embodiments provide for outputs that include a graph structure creating entities and links between them that are of free text. Outputs also include a continuous vector space representation (embeddings) for entities using the created graph (for machine understanding). Certain embodiments of the present disclosure also provide for a model that learned the entities and relationship links between entities using free text. Certain embodiments include a method to retrieve similar/contextually related entities without a KG.

Embodiments of the present disclosure create a Dynamic Entity Context Graph (ECG) that contains context information of the relationship from entity-centric text. Certain embodiments create triples of the form <entity><relation text><entity> to form the entity context graph. Certain embodiments provide for a system and method that is able to extract the triples, namely the entities and the relation text. The extracted relation in a triple is free text. The system is configured to learn entity and relationship embeddings without a semantic KG from the ECG. The system can dynamically encode the relationship text in ECG triples in the learning and testing processes. Therefore, certain embodiments provide a system and method that can enable related/similar entity retrieval for a given entity and a context text.

Certain embodiments provide for a graph creation and entity and relationship embedding learning process that is automated. Certain embodiments provide for a system and method that can support learning entity dynamics in changing data environment and sub-domain areas in which no entity-centric structured knowledge is available. Since building a traditional knowledge graph is costly, certain embodiments of the present disclosure do not need a KG. Moreover, existing semi-automated systems require seed patterns (at least a relaxed ontology) to extract triples, such as a NELL system as described in Mitchell, T., Cohen, W., Hruschka, E., Talukdar, P., Yang, B., Betteridge, J., Carlson, A., Dalvi, B., Gardner, M., Kisiel, B. and Krishnamurthy, J., 2018. Never-ending learning. *Communications of the ACM*, 61(5), pp. 103-115, the contents of which are hereby incorporated by reference in their entirety. Certain embodiments provide for a system and method that learns context between two entities and can use context to associate with an entity.

FIG. 1 illustrates an example network configuration 100 in accordance with this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module 180. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication. As described in more detail below, the processor 120 may analyze input audio data, automatically identify one or more languages used in the input audio data, and process the input audio data based on the identified language(s).

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The application 147 includes one or more applications for processing input data based on automated language detection as discussed below. These functions can be performed by a single application or by multiple applications that each carries out one or more of these functions. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 145 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external device.

The display 160 may include, for example, a liquid crystal display (LCD), a light emitting diode (LED) display, an organic light emitting diode (OLED) display, a quantum light emitting diode (QLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high definition multimedia interface (HDMI), recommended standard 232 (RS-232), or plain old telephone service (POTS). The network 162 or 164 may include at least one communication network, such as a computer network (like a local area network (LAN) or wide area network (WAN)), the Internet, or a telephone network.

The first external electronic device 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, an I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

In certain embodiments, a user of the electronic device 101 is interacting with an intelligent assistant, such as BIXBY, and based on a user action on a certain entity, such as a selection or request for information, the electronic device 101 attempts to retrieve similar entities. The electronic device 101, namely through the processor 120, is configured to measure similarity of an entity given another entity and handling changing data environment to learn entity dynamics; and retrieve an entity for a given context, conversational search over entities using free text.

First, the processor 120 is configured to measure the similarity of an entity given another entity and handling changing data environment to learn entity dynamics. Assume a scenario where entity related data changes (e.g., every day or few days) where keeping up with the changing data to update and maintain a knowledge graph becomes difficult but the system needs to adapt to support user needs. For example, a personal assistant needs to model person's conversational contexts relevant to interacting entities (movies, actors, shopping products, etc.) and general knowledge of entities. Moreover, the assistant needs to support this capability over many other users and automatically building traditional KGs and maintaining them is impractical and impossible (due to manual verification requirements and costs).

The disclosed system can represent the user preferences, and interactions using our textual context triples and build the entity context graph. The system can periodically process this graph and learn the entity and relation representations to support contextual search and retrieval operations with higher quality as the data is represented in a graph and the relationship encoder learns the latent relationships automatically in the training step. The system can enable handling frequently changing data environments because of the fact that the system does not need to generate and maintain a traditional knowledge graph and ontology.

Second, the processor 120 can retrieve an entity for a given context, conversational search over entities using free text. When the user is interested in an entity and together considers a context (expressed in text form), the processor 120 can easily retrieve contextually similar entities in relation to the given entity and context text that user may describe using free text (hence, inherently avoids vocabulary mismatch problem). Since triples are represented in our entity graph using context text, the system can encode the user given context text (which may describe a complex relation of the given entity) using the learned relation encoder and search in our entity graph using the given entity and encoded relation text to find most similar entities.

In certain and embodiments, the disclosed system and method can model entity dynamics in sub domains that are too costly and impractical to build KGs. In certain examples, a scenario exists in which links between cross-domain entities are required. For example, cross domain links between entities are important to support cross domain search and recommendation applications. Getting a relatedness link between two products that are under two different categories (in the ontology) is difficult because the vocabulary they share are quite different. Further, it is further necessary to customize an existing ontology to reflect these links or build one. Certain embodiments of the present disclosure are able to avoid customizing or building a knowledge graph for this purpose. Embodiments of the present disclosure can capture these latent cross domain links between entities by processing user reviews on them and creating triples in the form '<user><review_text><aspect>' by mining aspects on the reviews (this can be reviews or product descriptions). Then the disclosed system and method can learn the vector space representations for aspects. Since each product (entity) has a set of aspects assigned, by measuring similarity of aspects that belong to two cross domain products, we can get relatedness links between the entities.

Certain embodiments provide a system and method that support question answering (QA) using context and KG triples and improves coverage of KG triples. Updating KGs for new documents takes time as the process requires correctness and consistency checking and verifications (most of the time manual verification is needed if new facts and patterns to be extracted). Hence, a question answering system that uses KG triples to find answers may not be able to support new facts appearing in new documents. The disclosed context triple extraction from entity-based text documents is straightforward and can improve a question answering system to make use of context triples to enhance its capabilities by:

(1) If the QA system cannot find an answer from KG triples, it may search context triples to find answers and (2) Use extracted context triples to update KG triples so that missing knowledge can be added to the KG to improve coverage.

Context triples can be used to answer factual questions by having a matching component to align questions to textual relationships in the context triples and if a match is found, the matching context triples' object entities are the answers to the question. This matching/alignment can be done by mining or understanding the intent of the question and context triple description.

In certain embodiments, context triples can be used to extract traditional KG triples by extracting labeled relationships from the textual relationships of context triples and then forming KG triples (subject and object entities are the same in both context and KG triples and the extracted labeled relationship makes the KG triple). For this extraction, supervised extractors used in KG triple extraction process can be used with modifications (since only relation label extraction is required and the two entities of the triple are already identified).

Certain embodiments improve and support KG completion tasks through better KG embeddings and enhance QA capabilities through KG completion. KG coverage can be improved using context triples. Better KG entity embeddings can be generated by learning from both KG and context triples. Often, KGs contain incomplete knowledge because of errors and shortcomings in the complex extraction process. That means, some entities may miss some obvious information. For example, where 'Barack Obama' entity has the 'profession' relation value as 'politician,' 'Joe Biden' entity does not have it, even though it should have that information. Context triples can be created in an automated fashion. When these extracted context triples are used to compute better KG entity embeddings, such as using the combined learning discussed with respect to FIG. 10 below, the entity embeddings can be used to see if two entities are similar to each other by comparing their embeddings. This may not be possible to do with high accuracy without context triples because incomplete KG triples may not reflect the true similarity of the entities (context triples may contain the missing information and help entity embeddings to contain this information in the embedding space). If two entities are similar, they most probably should consist of similar relationships (i.e., edges in the KG). By analyzing two similar entities, it can be determined whether a relationship is missing for an entity (e.g., 'Joe Biden') compared to another similar entity (e.g., 'Barack Obama') and try to find related information and extract the missing facts. For example, link prediction is a technique used in KG completion tasks and we can use the context triples to learn better KG embeddings and predict missing links accordingly. Furthermore, this will enable wider coverage for KG construction and enable better QA support as discussed herein above.

Figure 2:
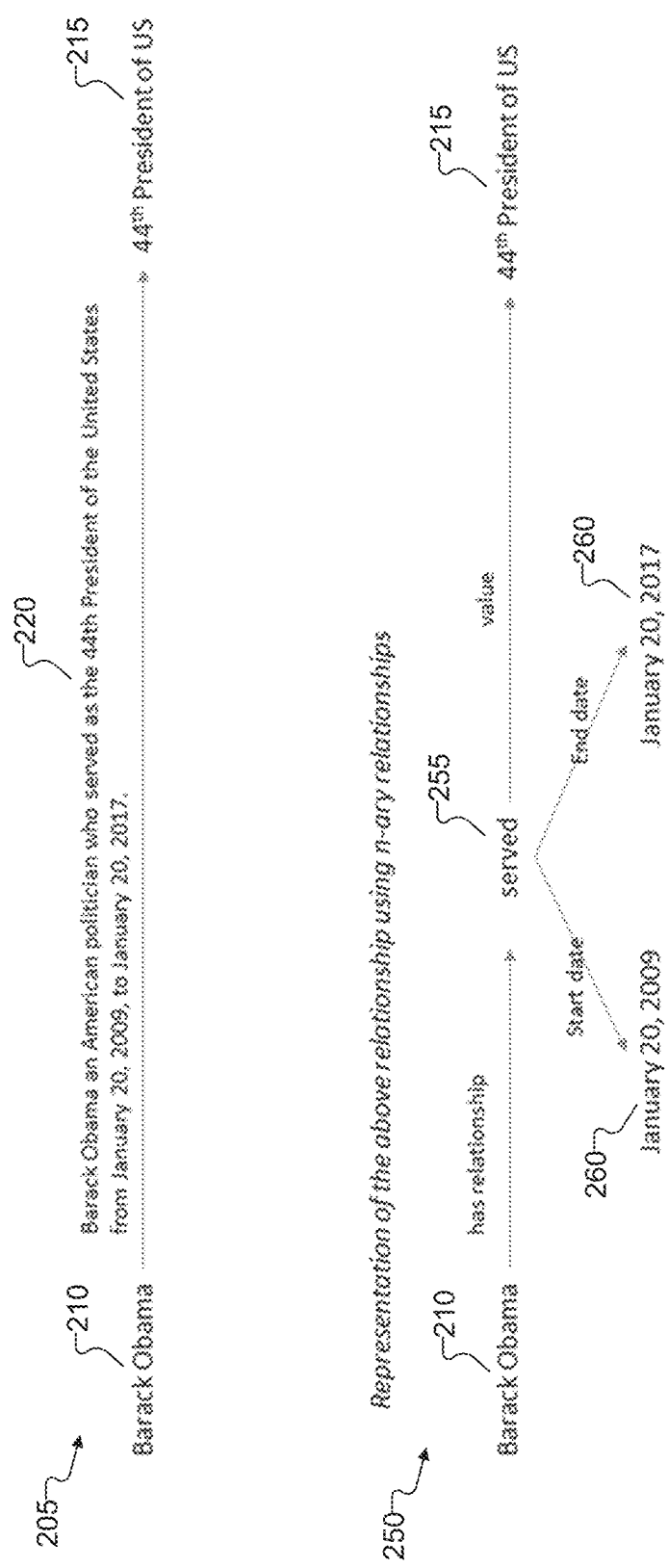
FIG. 2 illustrates an example triple representation according to embodiments of the present disclosure.

FIG. 2 illustrates an example triple representation according to embodiments of the present disclosure. The embodiment of the triple representation 200 shown in FIG. 2 is for illustration only. Other embodiments of triples could be used without departing from the scope of this disclosure.

The example shown in FIG. 2 illustrates how embodiments of the present disclosure capture a complex relationship between two entities by allowing the relation to contain free text. For example, a first triple representation 205 includes a first entity 210, which in the example is "Barack Obama", a second entity 215, which in the example is "44$^{th}$ President of US", and a context 220. The context 220 includes multiple words, namely free text, that describe a relationship between the first entity 210 and the second entity 215. In the example shown, the free text recites "Barack Obama an American politician who served as the 44$^{th}$ President of the United States from Jan. 20, 2009, to Jan. 20, 2017".

A triple extraction using n-ary relationships 250 also is shown in the example of FIG. 2. The triple extraction using n-ary relationships 250 includes the first entity 210, which in the example is "Barack Obama", the second entity 215, which in the example is "44$^{th}$ President of US", and a relationship 255. To illustrate the triple extraction for the complex relationship, the relationship 255 comprises singular text, in this case "served" with other multi-relational data 260, which can further define the relationship 255. For example, the multi-relational data 260 can include "start date" and "end date".

Embodiments of the present disclosure enable the triple extraction to capture complex relationships in a relatively easy process in text form, such as the free text of the context 220, and learn to encode the textual relation and then learn the entity dynamics of the multi-relational data. Multi-relational data means that a data point (i.e., entity) has many relations to other data points.

Figure 3A:
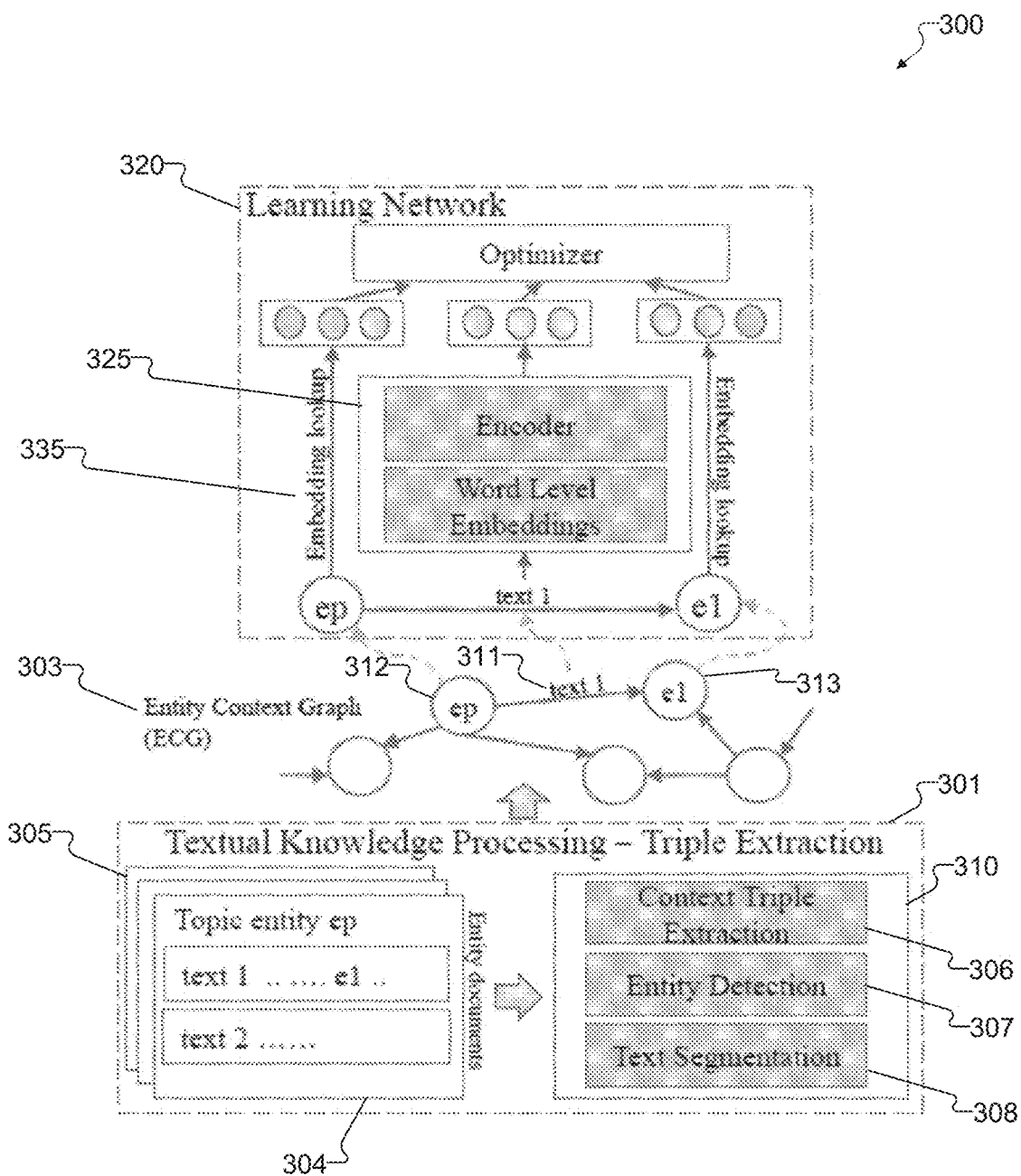
FIGS. 3A and 3B illustrate an Entity Context Graph (ECG) generator and an embedding learner according to embodiments of the present disclosure.
Figure 3B:
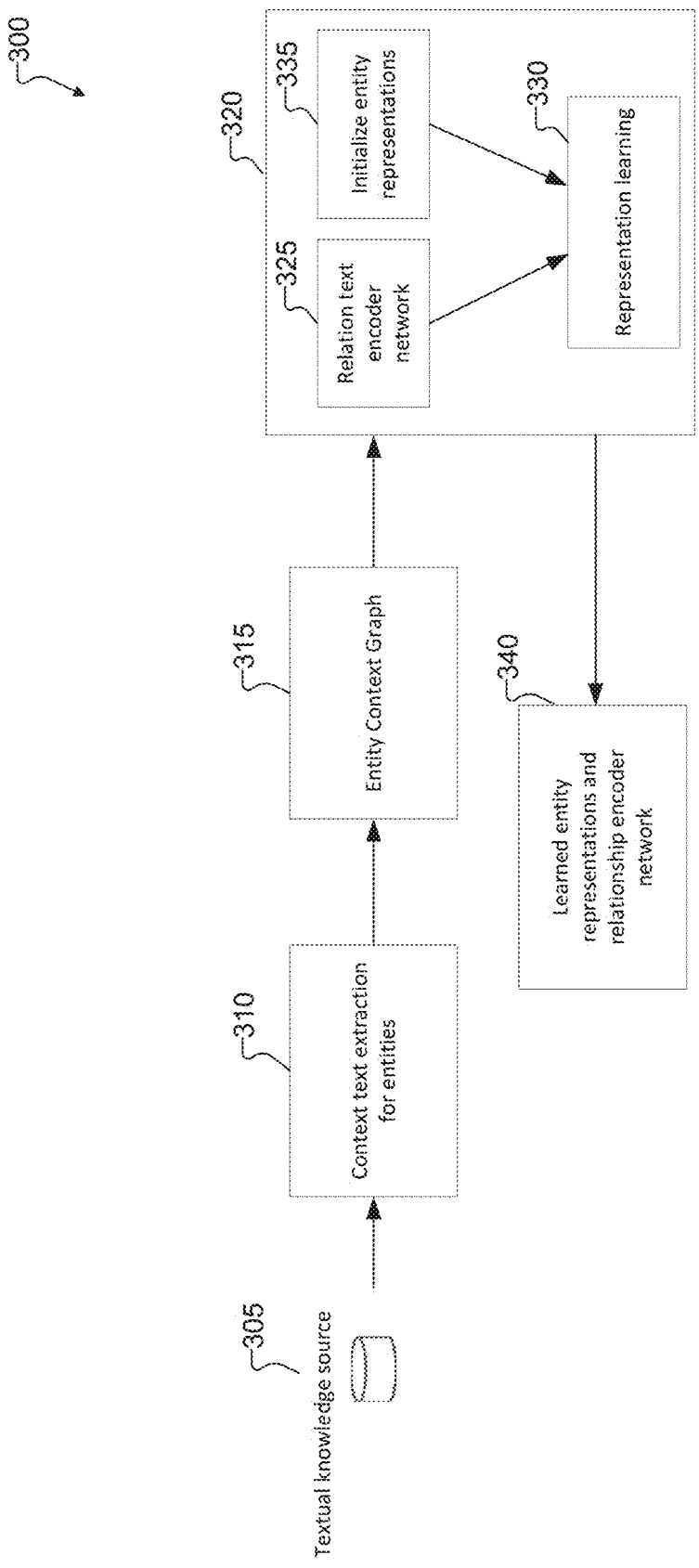

FIGS. 3A and 3B illustrate an Entity Context Graph (ECG) generator and an embedding learner according to embodiments of the present disclosure. The embodiment of the ECG generator and embedding learner 300 shown in FIGS. 3A and 3B are for illustration only. Other embodiments could be used without departing from the scope of the present disclosure. One or more of the components illustrated in FIGS. 3A and 3B can be included in one or more processors of a system configured to generate the ECG. For example, processor 120 can include one or more of a context text extractor 310, an entity context graph generator 315, combined relationship encoder and entity embedding learner 320.

In certain embodiments, the ECG generator 300 is configured to perform triple extraction to capture complex relationships in a relatively easy process in text form. The ECG generator 300 also learns to encode the textual relations. The ECG generator 300 further learns the entity dynamics of the multi-relational data.

In certain embodiments, the ECG generator 300 uses an 'entity-relation-entity' representation model. The relationships that link entities with meaning are the focus. First, a graph representation is extracted from a given textual entity centric dataset and is operated on to compute the embeddings. As illustrated in the example shown in FIG. 3A, the ECG generator includes a content triple extraction block 301 and a learning network, namely, combined relationship encoder and entity embedding learner 320.

The content triple extraction block 301 is configured to build ECGs 303. The content triple extraction block 301 performs textual knowledge processing, i.e., triple extraction one or more text strings for one or more topic entities included in one or more entity documents 304 obtained from a textual knowledge source 305. The content triple extraction block 301 receives the one or more text strings from the knowledge source 305 and performs context triple extraction, entity detection, and text segmentation in a context text extractor 310.

The learning network is embodied as a combined relationship encoder and entity embedding learner 320 and comprises embedding learning for entities using the ECGs 303. The combined relationship encoder and entity embedding learner 320 uses the ECGs 303 to obtain context text 311, topic entity 312, and a target entity 313. The combined relationship encoder and entity embedding learner 320 extracts word level embeddings and dynamically encodes the relationship text in ECG 303 triples. Additionally, the combined relationship encoder and entity embedding learner 320 looks-up the entities in the embedding matrix.

In the example shown in FIG. 3B, the textual knowledge source 305 includes information regarding entities and their relationships. For example, the textual knowledge source 305 can be one or more databases that describe entities. The textual knowledge source 305 can be a document, also referenced as a topic page, that describes an entity with reference to another entity. The textual knowledge source 305 also can be an input text string received via an input interface, such as a keyboard, touchscreen, receiver, transceiver, or the like.

A context text extractor 310 is configured to extract text descriptions from the textual knowledge source 305. For example, the processor 120 can extract the context 220 text from an input text string or from a document. The processor 120 extracts the contexts 220 that appear between two entities, such as between the first entity 210 and the second entity 215. In certain embodiments, the processor 120 extracts the first entity 210, the second entity 215, and the contexts 220. As noted herein, the contexts 220 can include free form text comprising multiple words or text strings. An entity context graph generator 315 is configured to create an entity context graph (ECG). For example, the processor 120 processes the extracted first entity 210, second entity 215, and contexts 220 to create entity context triples to form a graph representation of the relationships, namely the ECG 303. The processor 120 then uses the ECG generated by the entity context graph generator 315 to learn multi-relational entity embeddings using a relation encoder network 325, initialized entity representations in an entity lookup matrix 335, and representation learning network 330. Thereafter, the processor 120 generates an output 340 of the combined relationship encoder and entity embedding learner 320.

Figure 4:
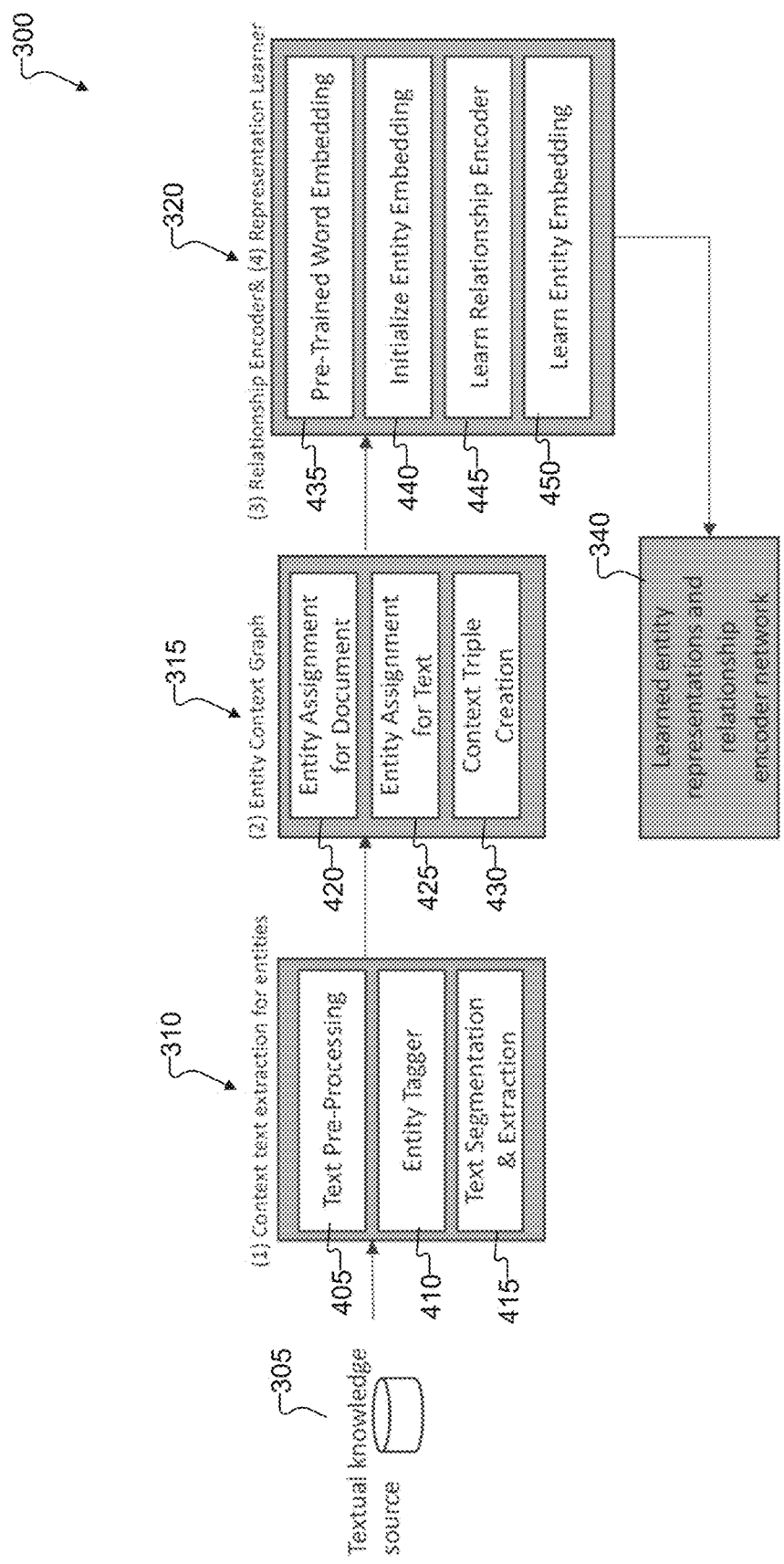
FIG. 4 illustrates sub-components of the Entity Context Graph (ECG) generator and embedding learner according to embodiments of the present disclosure.

FIG. 4 illustrates sub-components of the Entity Context Graph (ECG) generator and embeddings learner according to embodiments of the present disclosure. The embodiment of the ECG generator and embeddings learner 300 shown in FIG. 4 is for illustration only. Other embodiments could be used without departing from the scope of the present disclosure. Functions of the sub-components of the Entity Context Graph (ECG) generator and embeddings learner are further detailed with respect to FIGS. 5, 6, 7, and 8.

In the example shown in FIG. 4, the context text extractor 310 includes Text Pre-Processing 405, Entity Tagger 410, and Text Segmentation & Extraction 415. In certain embodiments, the processor 120 includes each of the components in the context text extractor 310. In certain embodiments, one or more of the components in the context text extractor 310 are performed by different processors or different systems.

Figure 5:
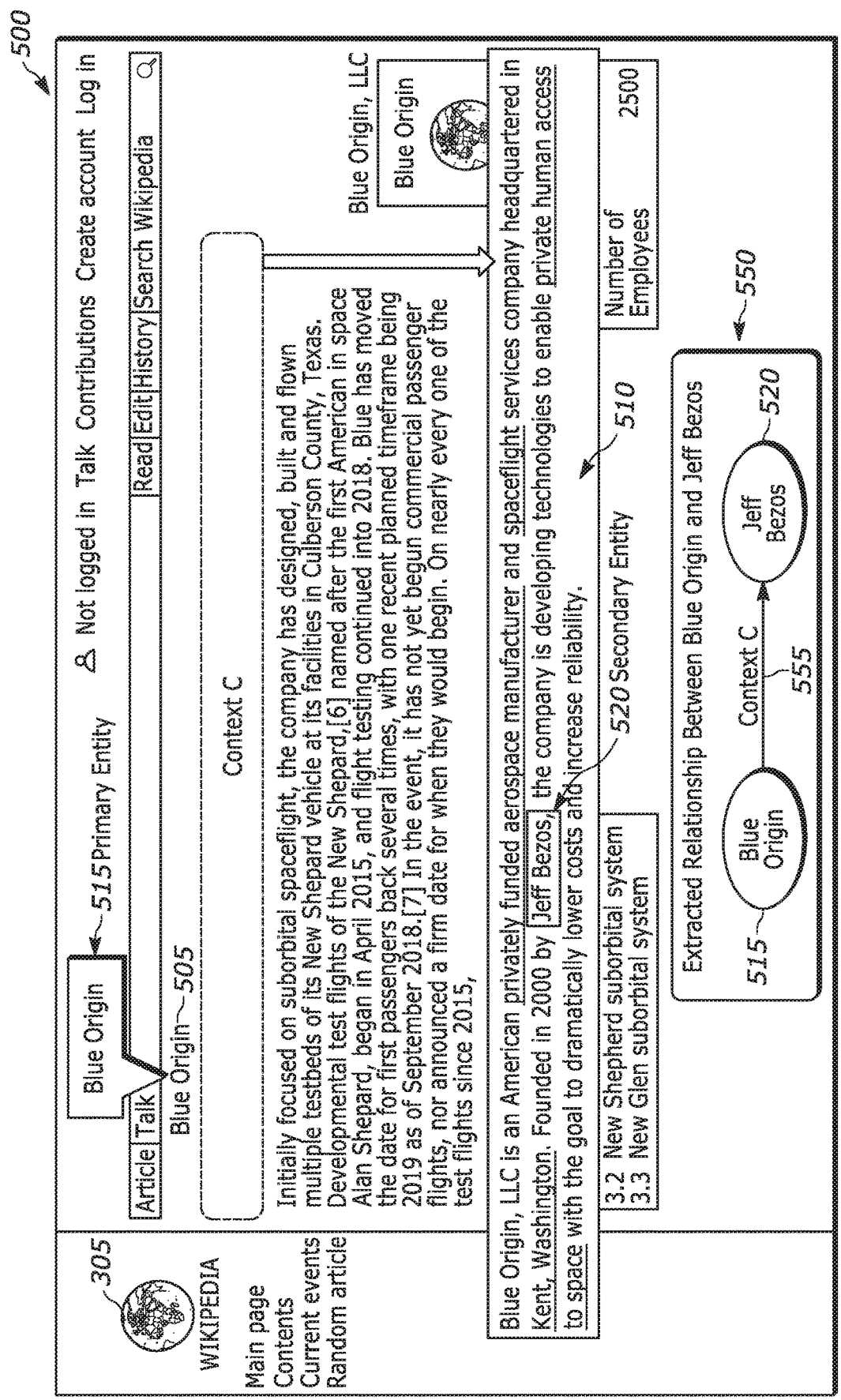
FIG. 5 illustrates a process for context text extraction for entities according to embodiments of the present disclosure.

FIG. 5 illustrates a process for context text extraction for entities according to embodiments of the present disclosure. The embodiment of the process 500 shown in FIG. 5 is for illustration only. Other embodiments could be used without departing from the scope of the present disclosure.

In the example shown in FIG. 5, a document 505 is received, accessed, or obtained from a textual knowledge source 305. For example, the document 505 can be a topic page about "Blue Origin, LLC" received from a textual knowledge source 305, in this case "Wikipedia". The document 505 describes a primary entity 515, here "Blue Origin" using a secondary entity 520, here "Jeff Bezos". The processor 120 extracts text descriptions, free form text segments 510, as relations between a primary entity 515 and a secondary entity 520. The processor 120 creates context triples including the extracted text segments 510, primary entity 515, and secondary entity 520. A conventional triple extraction in KGs has a fixed set of relation labels to construct triples. Embodiments of the present disclosure extract and put free form text segments 510 as relationships between two entities 515, 520. A text segment is extracted and, for each entity in the extracted text segment, context triples are created. For example, the processor 120 can create a context triple 550 illustrating the extracted relationship between Blue Origin and Jeff Bezos. The context triple 550 includes primary entity 515, which is "Blue Origin", secondary entity 520, which is "Jeff Bezos", In the example shown in FIG. 4, the entity context graph generator 315 includes Entity Assignment for Document 420, Entity Assignment for Text 425, and Context Triple Creation 430. In certain embodiments, the processor 120 includes each of the components in the entity context graph generator 315. In certain embodiments, one or more of the components in the entity context graph generator 315 are performed by different processors or different systems.

Figure 6:
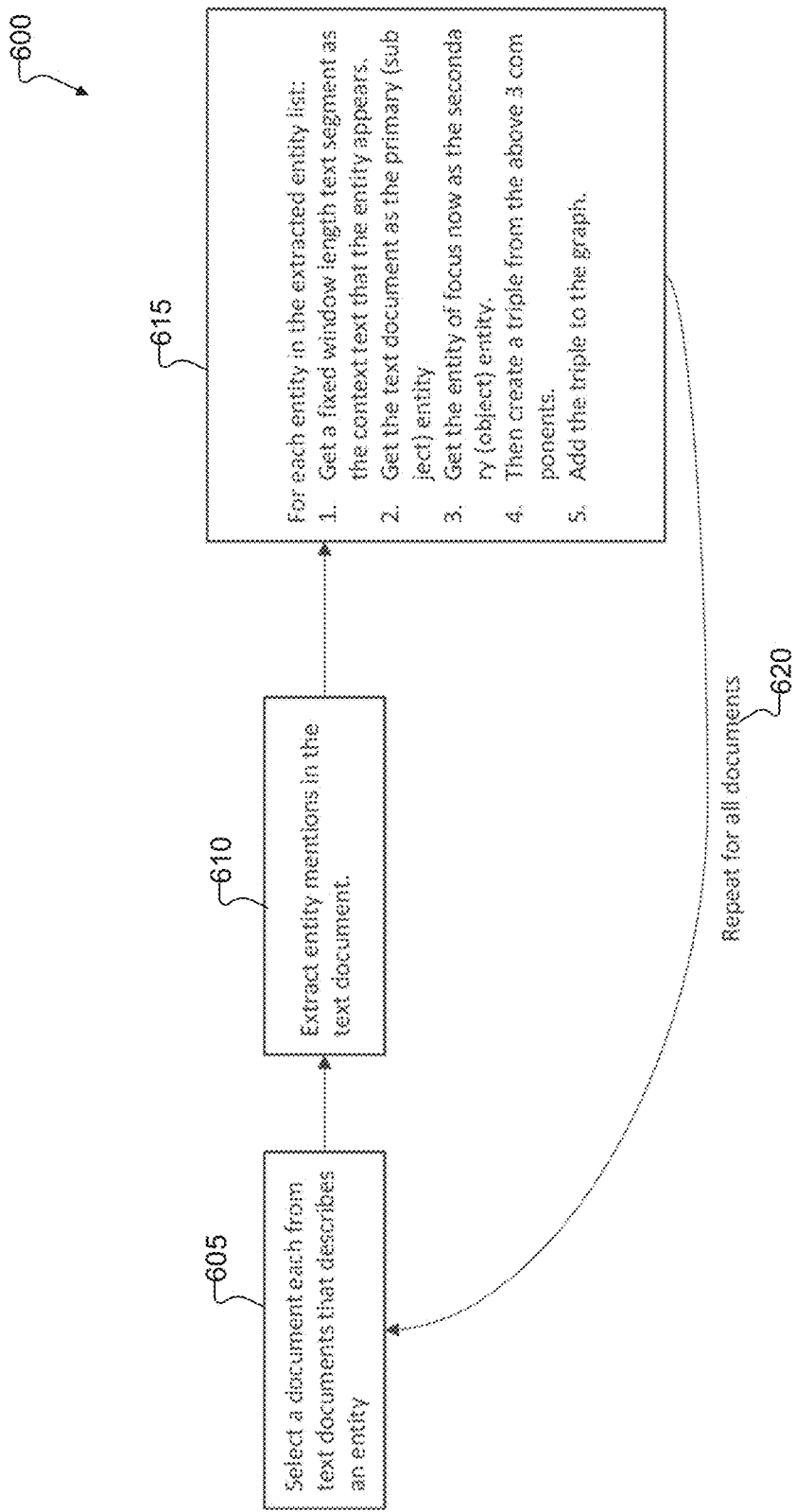
FIG. 6 illustrates a process for generating an entity context graph according to embodiments of the present disclosure.

FIG. 6 illustrates a process for generating an entity context graph according to embodiments of the present disclosure. The embodiment of the process 600 shown in FIG. 6 is for illustration only. Other embodiments could be used without departing from the scope of the present disclosure.

The algorithm to generate triples for the entity context graph is shown herein below. An example pseudo code for the algorithm is as follows:

1. input: Collection topic_pages
2. output: Entity Context Graph ecg
3. for all p∈topic_pages do
4. List entities←extractEntityMentions(p)
5. for all p∈topic_pages do
6. Text context←extractContext(p,e)
7. Node primary_entity←getNode(p)
8. Node secondary_entity←getNode(e)
9. Triple c_tripie←getTriple(primary_entity, context, secondary_entity)
10. addToGraph(ecg, c_triple)
11. end for
12. end for
13. return ecg The algorithm processes a collection of documents (topic_pages) describing facts or entities. Then for each entity or secondary entity mentioned in a document, text contexts are extracted. Then by following the pattern <primary_entity, context,secondary_entity>, context triples are generated to create the ECG.

To extract text segments that are relations, a fixed length sliding window is used on the text in which the secondary entity appears. The surrounding text area of an entity provides a latent relationship between the entity and topic (page focus) entity. That is, in block 605, a document is selected from one or more documents that describe an entity. In block 610, references to entities are extracted from the text document. Then, in block 615, for each entity: 1. A fixed window length text segment is obtained as the context text in which the entity appears; 2. Identify and/or extract the primary entity, i.e., subject of the document; 3. Identify and/or extract one or more entities of focus as the secondary entities, i.e., objects; 4. Create a triple from the text segment, primary entity, and secondary entity; and 5. Add the triple to the graph. Thereafter, the process is repeated 620 for all documents that describe other topic entities. Accordingly, by following this method of creating triples, a given text can be input to represent an edge between two entities.

In the example shown in FIG. 4, the combined relationship encoder and entity embedding learner 320 includes Pre-Trained Word Embedding 435, Initialize Entity Embedding 440, Learn Relationship Encoder 445; and Learn Entity Embedding 450. In certain embodiments, the processor 120 includes each of the components in the combined relationship encoder and entity embedding learner 320. In certain embodiments, one or more of the components in the combined relationship encoder and entity embedding learner 320 are performed by different processors or different systems.

Figure 7:
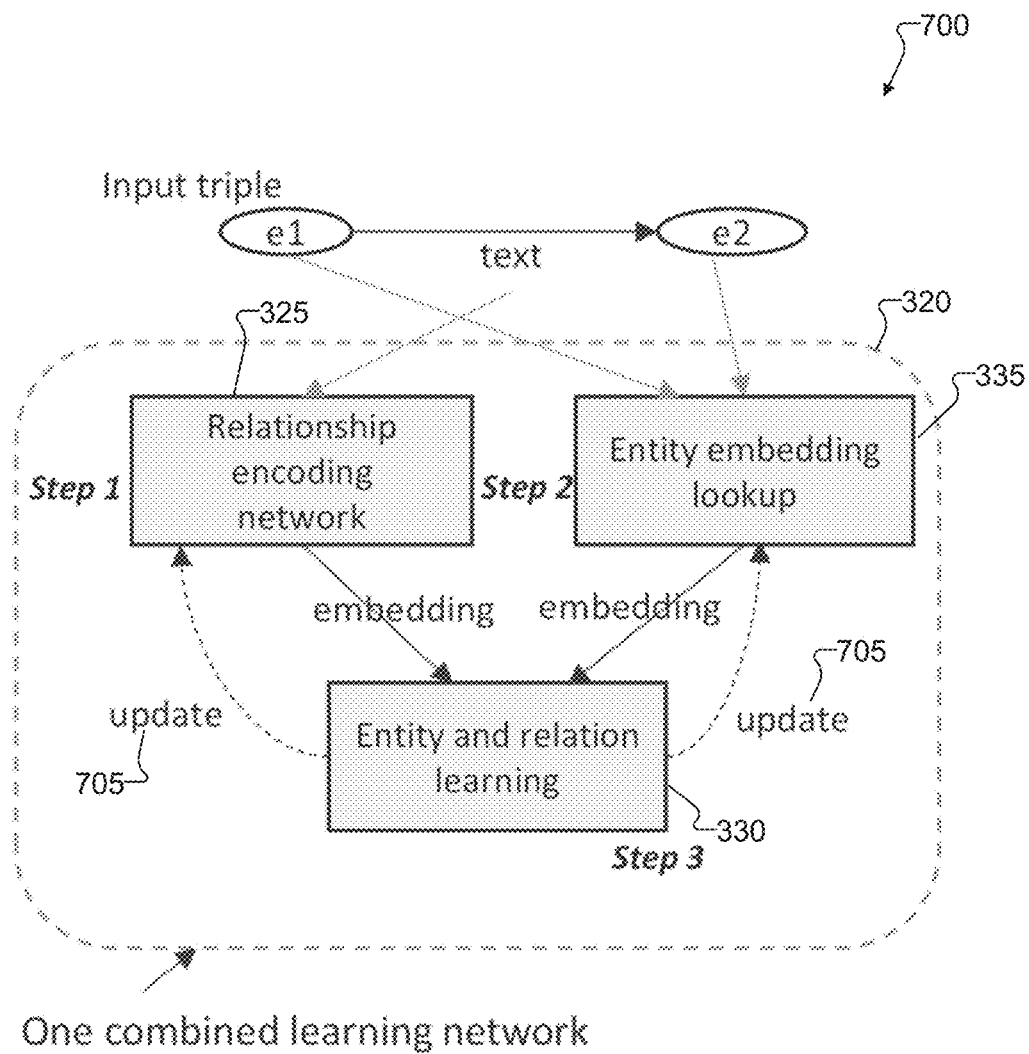
FIG. 7 illustrates a process for combined relationship encoder learning and embedding learning according to embodiments of the present disclosure.

FIG. 7 illustrates a process for combined relationship encoder learning and embedding learning according to embodiments of the present disclosure. The embodiment of the process 700 shown in FIG. 7 is for illustration only. Other embodiments could be used without departing from the scope of the present disclosure.

A convolution network is used to encode the relationship text in context triples. Previous learning methods consider the set of relations fixed and known but since certain representations of a relationship contain lengthy text, the relationship encoding network 325 learns to output the relationship embeddings for this text to work with the KG representation learning network 330 together with the initialized entity representations lookup matrix 335. The KG representation learning network 330 adjusts the relationship encoding network 325 weights and initialized entity representations in the lookup matrix 335, accordingly.

The learning happens in 3 steps as follows in the training stage.

Step 1: for a context triple, get the relationship, which is of free text and input to the relationship encoding network 325.

Step 2: lookup the entities in the embedding matrix 335.

Step 3: input the output of the relation encoding network 325 and looked up entity vectors from the entity lookup matrix 335 into the entity and relationship learning network 330. Based on the optimization function, the weights of the relationship encoding network 325 and entity embedding vectors in the entity lookup matrix 335 are updated 705.

Figure 8:
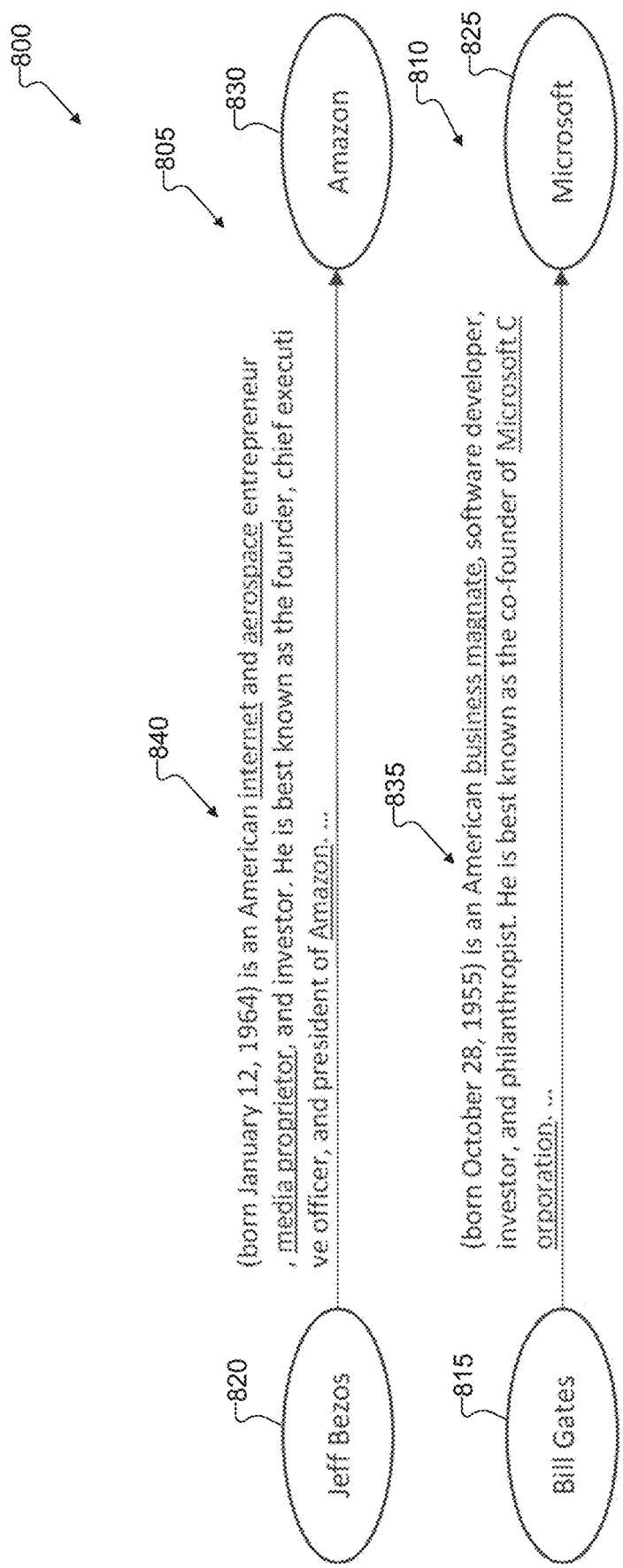
FIG. 8 illustrates an example for combined relationship encoder learning and embedding learning according to embodiments of the present disclosure.

FIG. 8 illustrates an example for combined relationship encoder learning and embedding learning according to embodiments of the present disclosure. The example of the combine relationship encoder learning and embedding learning 800 shown in FIG. 8 is for illustration only. Other embodiments could be used without departing from the scope of the present disclosure.

Since the extracted triples have long text descriptions for relationships, two relationships expressed can be literally different but semantically similar or the same. In the example shown in FIG. 8, the first triple 805 and the second triple 810 each express a person company "founder" relationship; but if the literal text representation is taken as the relationship label, the two triples 805, 810 have two distinct relationships, in terms of general KG triple representation. The relation encoding network 325 learns to encode these relationship texts to be similar when trained with many triples. For example, noting that Bill Gates 815 and Jeff Bezos 820 are two businessmen and MICROSOFT 825 and AMAZON 830 are companies, the combined relationship encoder and entity embedding learner 320 uses these similarities in the triples to assist learning to output relation encoder 325 output similarly when processing the free form text in the first context 835, between Bill Gates 815 as the primary entity and MICROSOFT 825 as the secondary entity, and the second context 840, between Jeff Bezos 820 as the primary entity and AMAZON 830 as the secondary entity.

Figure 9:
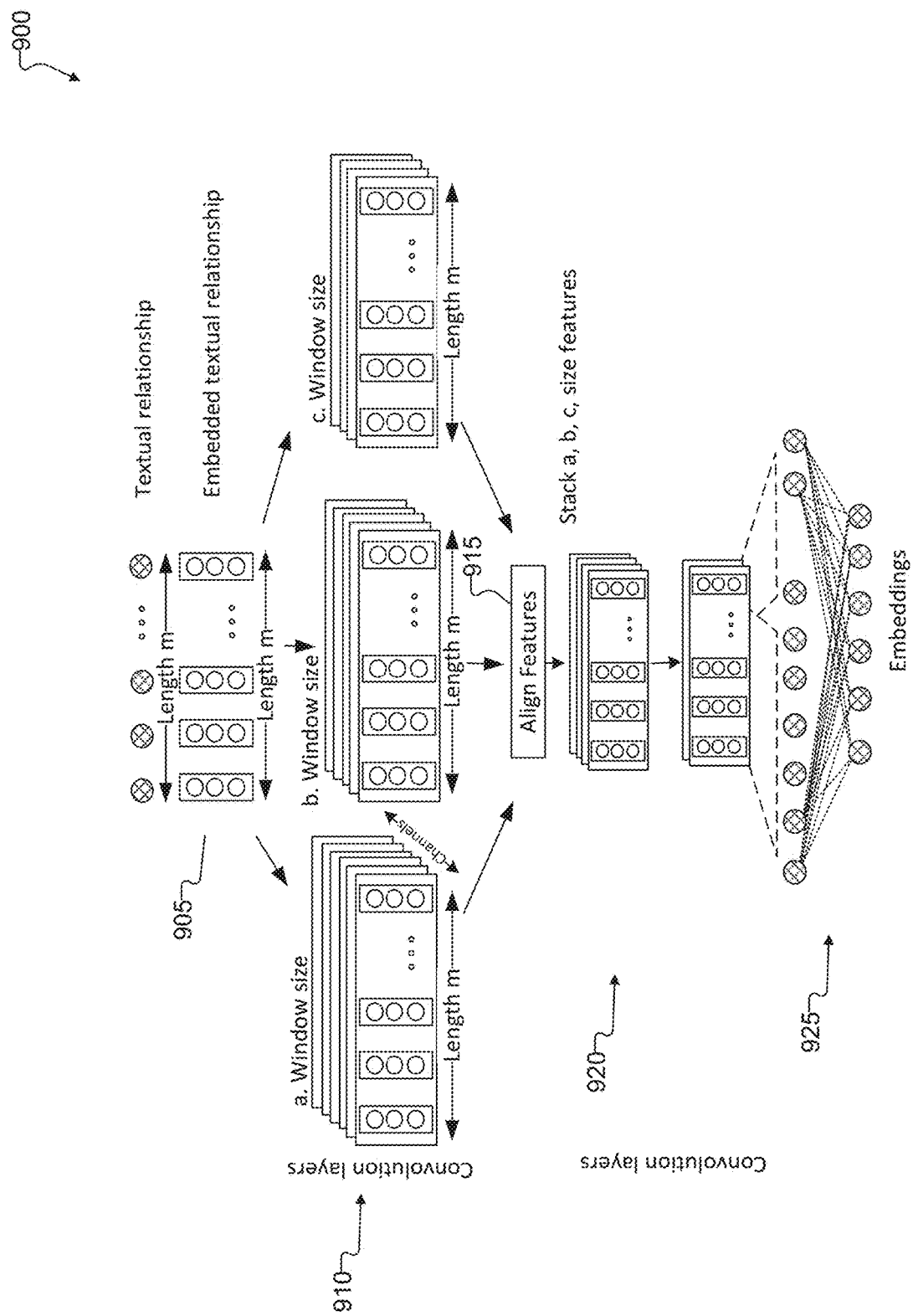
FIG. 9 illustrates a relationship encoding neural network according to embodiments of the present disclosure.

FIG. 9 illustrates a relationship encoding neural network according to embodiments of the present disclosure. The example of the relationship encoding neural network 900 shown in FIG. 9 is for illustration only. Other embodiments could be used without departing from the scope of the present disclosure. The relationship encoding neural network 900 can be implemented by, the same as, or similar to, the relation encoder network 325. In certain embodiments, relation encoder network 325 can be configured differently.

In certain embodiments, the relationship encoding neural network 900 includes a deep convolution neural network (CNN) configured to perform the relationship encoding. First, the input text description, such as first context 835, is embedded using a pre-trained word embedding 905. For embedding the input text, let $x_i \in \mathbb{R}^a$ be the d dimensional word vector representation corresponding to the $i^{th}$ word in the relationship text. A textual relationship of length m (padded when necessary) is represented as:

$$x_{i:m} = x_1 \oplus x_2 \oplus \ldots \oplus x_m \quad (1)$$

where $\oplus$ is the concatenation operator.

Then, for the embedded text, the relationship encoding neural network 900 mines different length features by applying different window size convolutions 910 and max pooling. Thereafter, the relation encoder network 325 combines 915 all the mined features (stack) to perform another convolution operation 920. In certain embodiments, after each convolution in the first layer 910, the feature maps are aligned by max pooling using a constant β>c (where y=a<b<c). That is, to make the feature maps align correctly, z, the max pooling window size, is set to be β−a+1, β−b+1, and β−c+1 for feature maps mined from a, b, and c, respectively.

The convolution layer 910 operation performs as a filter w∈$\mathbb{R}^{yd}$, which applies to a window of size y words to produce a new feature. For each of these features, a non-linear activation f is applied according to:

$$h_i = f(w \cdot x_{i:i+y-1} + b) \quad (2)$$

where b∈$\mathbb{R}$ is the bias. After applying the convolution filters, the following feature map $h_i=[h_1, h_2, \ldots, h_{im-y+1}]$ is obtained, where h∈$\mathbb{R}^{m-y+1}$. With padding, the input length (m) can be as the dimension for h. A max pooling operation over window size z on feature map h is performed to select maximum values corresponding to the window size z. The max pooling outputs the feature map=$[\hat{h}_1, \ldots, \hat{h}_{im-y+1}]$. Padding can be applied for length consistency and the window (y and z) can have sliding strides other than 1. Additional convolution and max pooling layers are applied 920. Thereafter, a fully connected layer to output 925 the encoded text relationship.

The CNN is used to encode the textual relationships in the context triples and any encoding network can also be used and weight adjustment of this network will be done together with the entity and relationship representation algorithm.

In certain embodiments, to learn the interaction between entities and relations and represent them in the vector space (i.e., embedding), representation learning network 330 uses translation-based KG embedding technique. The representation learning network 330 learns to represent a triple (h,r,t) with head (h), relation (r), and tail (t) using corresponding vectors h, r, and t as follows:

$$h + r \approx t \quad (3)$$

The KG learning method optimizes the following margin based loss where S' is the set of corrupted triples from correct set S, and E is the set of entities.

$$\mathcal{L} = \Sigma_{(h,r,t) \in S} \Sigma_{(h',r,t') \in S'_{(h,r,t)}} \max((\gamma + d(h+r,t) - d(h'+r,t')), 0) \quad (4)$$

$$S'_{(h,r,t)} \{(h',r,t)|h' \in E\} \cup \{(h,r,t')|t' \in E\} \quad (5)$$

The normalized vector representation is used for each part of the triple and mean loss. The relationships (r) are dynamically encoded using the relation encoder network 325 and entity vectors are from the entity embedding look up matrix 335.

$$\mathcal{L}' = \Sigma_{(h,r,t) \in S} \Sigma_{(h',r,t') \in S'_{(h,r,t)}} {}^n\max(\gamma + f(\hat{h} + \hat{r}, \hat{t}) - f(\hat{h}' + \hat{r}, \hat{t}')), 0) + \mu/n \quad (6)$$

In Equation 6, μ is the regularization and 2 is the normalized vector of x.

In certain embodiments, the relation encoder network 325 includes a long short-term memory (LSTM) neural network comprising digital circuitry configured to perform the relationship encoding using a sequence modeling approach. Additionally, in certain embodiments, the representation learning network 330 can be configured to perform different optimization methods, including optimization methods based on a graph convolution.

Figure 10:
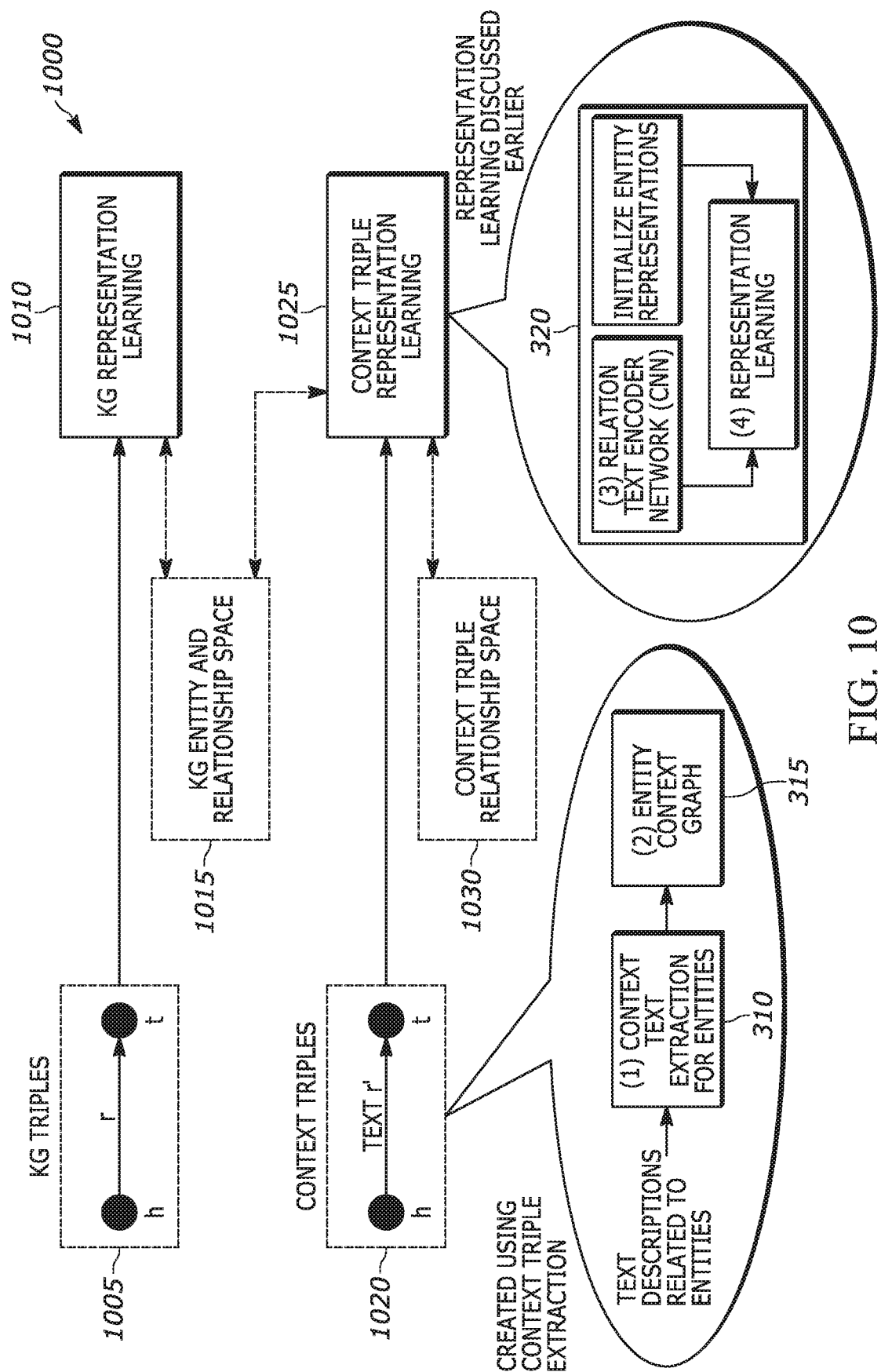
FIG. 10 illustrates a process for using entity context graph-based embedding learning to improve KG-based embeddings according to embodiments of the present disclosure.

FIG. 10 illustrates a process for using entity context graph-based embedding learning to improve KG-based embeddings according to embodiments of the present disclosure. The embodiments of the process 1000 shown in FIG. 10 is for illustration only. Other embodiments could be used without departing from the scope of the present disclosure.

Knowledge graphs contain high quality information but often times they are incomplete due to many reasons such as:
(i): Triple extractor is not available to capture a particular relationship between entities,
(ii): Error in formal triple extraction, and
(iii): Takes time to update and verify information to put into a KG.

Because some information is missing from the KG, two entities may not exhibit similarity in a particular relationship instance. For example, assuming that "Jeff Bezos"—founder_of→"Amazon" triple does not exist in the KG (and also true for many such entity pairs in the KG), when using embeddings of "Jeff Bezos" and "Amazon", it is difficult to learn the similarity of the two entities in relation to 'founder of' relation because embedding learning will not learn a better embedding for this relationship on the KG due to very less training examples. Embodiments of the present disclosure allow for easy capturing of 'context triples' and then use these triples together with the KG triples to learn the embeddings. By doing so, these embodiments are able to model 'founder_of' relation between entity pairs and also the transformation of the two entities along the direction of the vector 'founder_of' in the embedding space. This is due to additional knowledge obtained from processing text documents and modelling context triples.

In certain embodiments, entity context graph and representation learning are used to improve pure KG-based embeddings by jointly learning where the entity space is shared between the two learning approaches, but not the relationship space. That is, a knowledge representation format system, such as based on or using ECG generator 300, can be configured to use the generated ECG 303 to improve a KG-based embedding by sharing the entity spaces for both the KG-based and ECG-based networks and processing KG triples and ECG triples.

In block 1005, pure KG-based triples are received. The KG-based triples include a head (h), relation (r), and tail (t). In block 1010, to learn the interaction between entities, e.g., h and t, and relations and represent them in the vector space (i.e., embedding), the KG representation learning network uses translation-based KG embedding technique. The KG representation learning network represents the KG-base triple (h, r, t) using corresponding vectors h, r, and t and outputs to the KG Entity and Relationship block 1015. In block 1020, ECG-based triples are obtained. For example, the ECG-based triples can be in the form of an ECG 303 generated by the context text extractor 310 and the entity context graph generator 315. The ECG-based triples include a head (h), free-form text relation (r), and tail (t). In block 1025, to learn the interaction between entities, e.g., h and t, and relations and represent them in the vector space (i.e., embedding), the Context Triple Representation Learning Network, such as combined relationship encoder and embedding learner 320, obtains the ECG-based triples and only the KG entity embeddings from block 1015 and dynamically encodes the relationships as discussed herein above with respect to FIGS. 3B, 7, and 9. The Context Triple Representation Learning Network outputs to the Context Triple Relationship space block 1030 (representation of context text relationships in the vector space), which is used in further iterations and convolutions in the Context Triple Representation Learning Network block 1025. A CNN is used to encode the textual relationships in the context triples and any encoding network (e.g., LSTM) can also be used and weight adjustment of this network will be done together with the entity and relationship representation algorithm.

Figure 11:
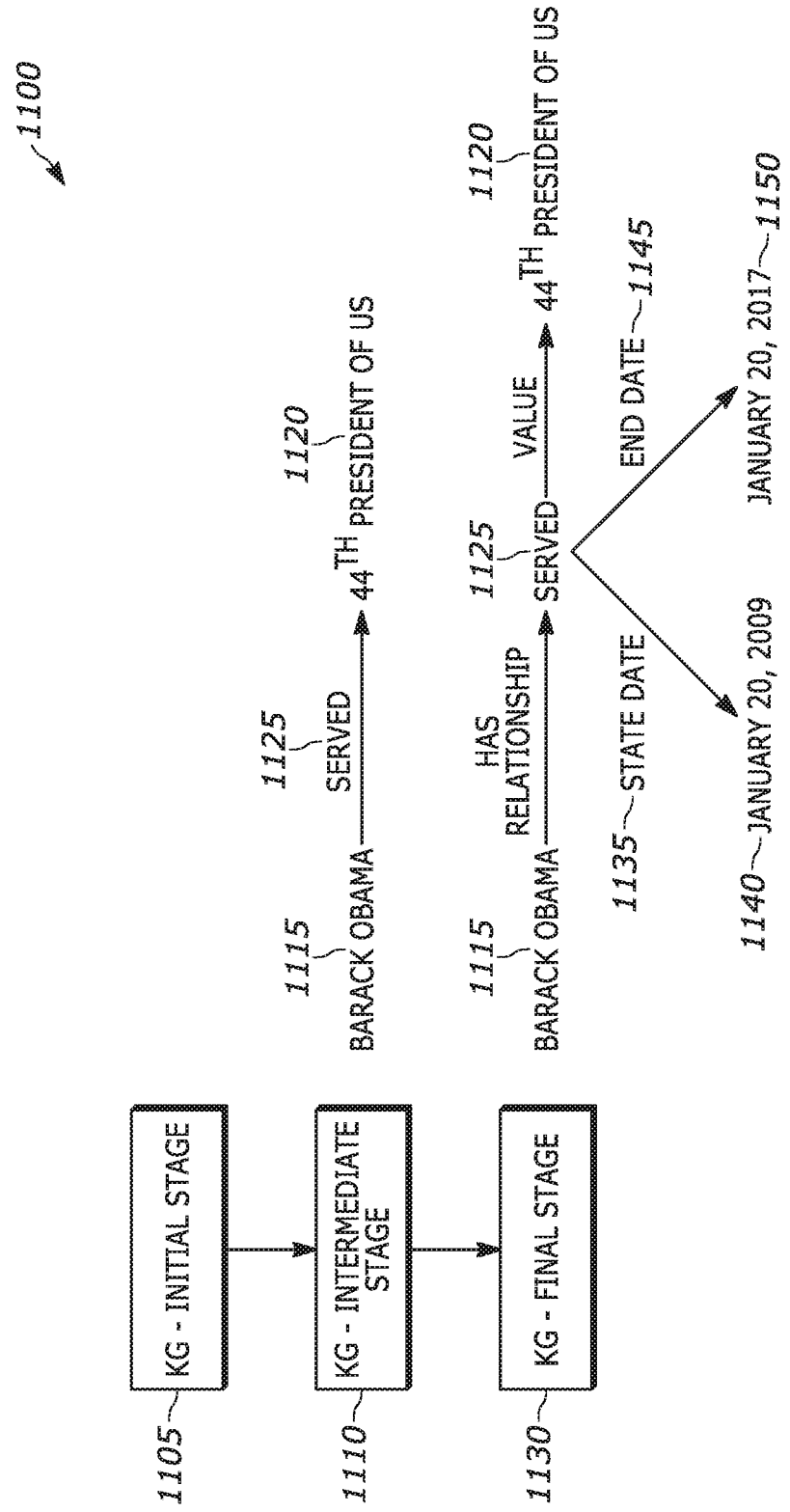
FIG. 11 illustrates a process for generating additional traditional knowledge graph triples from context triples according to embodiments of the present disclosure.

FIG. 11 illustrates a process for generating additional traditional knowledge graph triples from context triples according to embodiments of the present disclosure. The embodiment of the process 1100 shown in FIG. 11 is for illustration only. Other embodiments could be used without departing from the present disclosure.

In an initial stage in block 1105, a memory or database for a knowledge reference system contains KG triples and Context triples. No post-processing is performed for the Context triples. When a question is received, the knowledge reference system searches the KG to find the answer. For example, a processor, such as processor 120, searches the KG triples in the memory, such as memory 130, for a relationship mentioned in the question. If no match is found or if the KG does not contain the fact, the processor is unable to provide an answer to the question.

In KG-intermediate state in block 1110, the processor determines that the memory or database contains KG triples and intermediate post-processed context triples. The processor extracts a most prominent/suitable relation word/verb as the relation to represent a traditional KG triple by joining subject and object entities of the Context triple. Now the KG has additional triples extracted from Context triples. When a question is received, the KG is searched for triples with a matching relation identified in the question. For example, when a question is received about Barak Obama 1115, the processor can search for a triple to identify 44$^{th}$ president of the US 1120 as a tail, and serve 1125 as a relation.

In KG-final state in block 1130, the processor determines that the memory or database contains KG triples and fully post-processed Context triples. The processor processes the Context text in Context triples to extract more KG triples and add to the KG. Now the KG has more additional triples extracted from Context triples. When a question is received, the enhanced KG is searched for triples with a matching relation identified in the question. For example, when a question is received about Barak Obama 1115, the processor can search for a triple to identify 44$^{th}$ president of the US 1120 as a tail, and serve 1125 as a relation, as well as a start date 1135 of Jan. 20, 2009 1140 and an end date 1145 of Jan. 20, 2017 1150.

Embodiments of the present disclosure can extract traditional KG triples by processing the textual description of the context triple. The context triple has already subject and object entities identified. The relationship text has more details including the prominent main relationship. Embodiments of the present disclosure can extract this prominent relationship by performing a dependency parsing, learning based, or mining text for focus/root term detection in the relationship text.

Then, embodiments of the present disclosure can extract more KG triples within the context text description if available. For this, embodiments of the present disclosure use existing triple extraction techniques (supervised learning based or pattern based). If the extracted triples have the first triple's subject or object, links are made to those entities using subject or object entity. By analyzing dependencies (using a dependency parser), the disclosed system and method can determine whether the main relationship that was extracted earlier (e.g., 'served' in this example) has dependency to other extracted relationships in the text description. Note that this may require dependency parsing and more processing that require algorithm training to identify such dependencies. Such a processing may determine 'start date' and 'end date' in this example that actually link to/depend on 'served' relationship. Then, at that point it can be determined that it is an n-ary relationship and link the two additional triples extracted to the main relation extracted. Also note that, context triples may support extraction of this type of complex KG triple patterns because it may contain additional information within the relationship text whereas, in a traditional KG triple extraction, most of the time, a single sentence based extraction is performed. Hence, they may miss such knowledge extractions.

Note that if no more triples can be extracted, then the main triple representing the context triple is what is obtained by extracting the main relationship term (described in the first point above). Also, if the additional triples extracted do not depend on the main relationship extracted first, the newly extracted triples will be linking to subject or object entities of the first extracted triple (i.e., no n-ary triple pattern).

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method comprising:
receiving, by at least one processor, an input text;
identifying a primary entity, a secondary entity, and a context from the input text, wherein the context is free form text from the input text that comprises one or more relationships between the primary entity and the secondary entity; and
generating, by the at least one processor, an entity context graph based on the primary entity, the secondary entity, and the context by:
extracting, from the context, one or more free form text segments comprising a plurality of words describing the one or more relationships between the primary entity and the secondary entity;
generating a plurality of context triples from the one or more free form text segments, each of the plurality of context triples defining a relationship of the one or more relationships between the primary entity and the secondary entity by associating the one or more free form text segments with the primary entity and the secondary entity; and adding the plurality of context triples to the entity context graph.

2. The method of claim 1, wherein identifying the primary entity, the secondary entity, and the context from the input text comprises obtaining a pre-existing knowledge-graph triple from a pre-existing knowledge-graph.

3. The method of claim 2, further comprising:
receiving an inquiry regarding the primary entity;
determining that the pre-existing knowledge-graph triple does not contain a matching relationship to the inquiry; and
providing an answer based on at least one of the plurality of context triples in the entity context graph.

4. The method of claim 3, further comprising:
creating an enhanced knowledge-graph by updating the pre-existing knowledge-graph based on the entity context graph.

5. The method of claim 1, wherein generating the plurality of context triples from the one or more free form text segments further comprises:
encoding the relationship;
looking up the primary entity and the secondary entity in an embedding matrix; and
updating, based on the encoded relationship and looked-up entities, weights for the encoding and vectors in the embedding matrix.

6. The method of claim 5, wherein the encoding is performed by a convolution neural network (CNN), the CNN configured to:
embed the context using a pre-trained word embedding;
mine different length features by applying different window size convolutions and max pooling; and
combine the mined different length features.

7. The method of claim 1, wherein:
identifying the secondary entity comprises identifying a plurality of secondary entities; and
generating the plurality of context triples from the one or more free form text segments comprises generating n triple patterns based on n number of secondary entities identified.

8. An electronic device comprising:
at least one processor; and
at least one memory operably coupled to the at least one processor, the at least one memory including instructions executable by the at least one processor to:
receive an input text;
identify a primary entity, a secondary entity, and a context from the input text, wherein the context is free form text from the input text that comprises one or more relationships between the primary entity and the secondary entity; and
generate an entity context graph based on the primary entity, the secondary entity, and the context;
wherein the instructions executable by the at least one processor to generate the entity context graph comprise instructions executable by the at least one processor to:
extract, from the context, one or more free form text segments comprising a plurality of words describing the one or more relationships between the primary entity and the secondary entity;
generate a plurality of context triples from the one or more free form text segments, each of the plurality of context triples defining a relationship of the one or more relationships between the primary entity and the secondary entity by association of the one or more free form text segments with the primary entity and the secondary entity; and
add the plurality of context triples to the entity context graph.

9. The electronic device of claim 8, wherein the instructions executable by the at least one processor to identify the primary entity, the secondary entity, and the context from the input text comprise:
instructions executable by the at least one processor to obtain a pre-existing knowledge-graph triple from a pre-existing knowledge-graph.

10. The electronic device of claim 9, wherein the instructions are further executable by the at least one processor to:
receive an inquiry regarding the primary entity;
determine that the pre-existing knowledge-graph triple does not contain a matching relationship to the inquiry; and
provide an answer based on at least one of the plurality of context triples in the entity context graph.

11. The electronic device of claim 10, wherein the instructions are further executable by the at least one processor to:
update the pre-existing knowledge-graph based on the entity context graph to create an enhanced knowledge-graph.

12. The electronic device of claim 8, wherein the instructions executable by the at least one processor to generate the plurality of context triples from the one or more free form text segments comprise instructions executable by the at least one processor to:
encode the relationship;
look up the primary entity and the secondary entity in an embedding matrix; and
update, based on the encoded relationship and looked-up entities, weights for the encoding and vectors in the embedding matrix.

13. The electronic device of claim 12, wherein the at least one processor comprises a convolution neural network (CNN) configured to:
embed the context using a pre-trained word embedding;
apply different window size convolutions and max pooling to mine different length features; and
combine the mined different length features.

14. The electronic device of claim 13, wherein:
the instructions executable by the at least one processor to identify the secondary entity comprise instructions executable by the at least one processor to identify a plurality of secondary entities; and
the instructions executable by the at least one processor to generate the plurality of context triples from the one or more free form text segments comprise instructions executable by the at least one processor to generate n triple patterns based on n number of secondary entities identified.

15. A non-transitory machine-readable medium containing instructions that when executed cause at least one processor of an electronic device to:
receive an input text;
identify a primary entity, a secondary entity, and a context from the input text, wherein the context is free form text from the input text that comprises one or more relationships between the primary entity and the secondary entity; and
generate an entity context graph based on the primary entity, the secondary entity, and the context;

wherein the instructions that when executed cause the at least one processor to generate the entity context graph comprise instructions that when executed cause the at least one processor to:
- extract, from the context, one or more free form text segments comprising a plurality of words describing the one or more relationships between the primary entity and the secondary entity;
- generate a plurality of context triples from the one or more free form text segments, each of the plurality of context triples defining a relationship of the one or more relationships between the primary entity and the secondary entity by association of the one or more free form text segments with the primary entity and the secondary entity; and
- add the plurality of context triples to the entity context graph.

16. The non-transitory machine-readable medium of claim 15, wherein the instructions that when executed cause the at least one processor to identify the primary entity, the secondary entity, and the context from the input text comprise:
- instructions that when executed cause the at least one processor to obtain a pre-existing knowledge-graph triple from a pre-existing knowledge-graph.

17. The non-transitory machine-readable medium of claim 16, further containing instructions that when executed cause the at least one processor to:
- receive an inquiry regarding the primary entity;
- determine that the pre-existing knowledge-graph triple does not contain a matching relationship to the inquiry; and
- provide an answer based on at least one of the plurality of context triples in the entity context graph.

18. The non-transitory machine-readable medium of claim 17, further containing instructions that when executed cause the at least one processor to:
- update the pre-existing knowledge-graph based on the entity context graph to create an enhanced knowledge-graph.

19. The non-transitory machine-readable medium of claim 15, further containing instructions that when executed cause the at least one processor to:
- encode the relationship;
- look up the primary entity and the secondary entity in an embedding matrix; and
- update, based on the encoded relationship and looked-up entities, weights for the encoding and vectors in the embedding matrix.

20. The non-transitory machine-readable medium of claim 15, wherein:
- the instructions that when executed cause the at least one processor to identify the primary entity, the secondary entity, and the context from the input text comprise instructions that when executed cause the at least one processor to obtain a knowledge-graph triple;
- the instructions that when executed cause the at least one processor to identify the secondary entity comprise instructions that when executed cause the at least one processor to identify a plurality of secondary entities; and
- the instructions that when executed cause the at least one processor to generate the plurality of context triples from the one or more free form text segments comprise instructions that when executed cause the at least one processor to generate n triple patterns based on n number of secondary entities identified.

* * * * *